(12) United States Patent
Senger et al.

(10) Patent No.: US 10,619,441 B2
(45) Date of Patent: Apr. 14, 2020

(54) WELLHEAD ASSEMBLY WITH INTEGRATED TUBING ROTATOR

(71) Applicant: OIL LIFT TECHNOLOGY INC., Calgary (CA)

(72) Inventors: Ross Senger, Airdrie (CA); Denis Blaquiere, Calgary (CA); Ramamurthy Narasimhan, Bangalore (IN); Manjunath Devalapalli Prakash Reddy, Bangalore (IN); Manjunath Jayanthi Narayana Setty, Bangalore (IN); Santhosha Singanahalli Malleshappa, Karnataka (IN); Kogan Lee, Calgary (CA)

(73) Assignee: Oil Lift Technology Inc., Calgary (CA)

( * ) Notice: Subject to any disclaimer, the term of this patent is extended or adjusted under 35 U.S.C. 154(b) by 151 days.

(21) Appl. No.: 15/863,691

(22) Filed: Jan. 5, 2018

(65) Prior Publication Data

US 2018/0195361 A1 Jul. 12, 2018

Related U.S. Application Data

(60) Provisional application No. 62/443,108, filed on Jan. 6, 2017.

(51) Int. Cl.
*E21B 33/04* (2006.01)
*F16H 1/16* (2006.01)
(Continued)

(52) U.S. Cl.
CPC .......... *E21B 33/0415* (2013.01); *E21B 33/03* (2013.01); *E21B 33/062* (2013.01);
(Continued)

(58) Field of Classification Search
CPC .. E21B 33/0415; E21B 33/061; E21B 33/062; E21B 33/03; E21B 33/06; E21B 33/085; E21B 34/02
See application file for complete search history.

(56) References Cited

U.S. PATENT DOCUMENTS 5,427,178 A * 6/1995 Bland ................. E21B 33/0415
166/78.1
5,617,917 A 4/1997 Squires
(Continued)

FOREIGN PATENT DOCUMENTS

| CA | 2203091 | 1/1998 |
| CA | 2254480 | 5/2000 |
| CA | 2355555 | 1/2003 |

*Primary Examiner* — David Carroll
(74) *Attorney, Agent, or Firm* — Parlee McLaws LLP; Chi Fai Andrew Lau

(57) ABSTRACT

Embodiments of a wellhead assembly have a tubular body with a removable bottom cap to house a tubing rotator comprising a multi-enveloping worm gear assembly which provides sufficient torque to rotate tubing strings in deep and/or deviated wellbores. The bottom cap is supported on a wellhead having a dognut for supporting a production string therefrom in a wellbore. The bottom cap rotatably supports a mandrel and multi-enveloping worm wheel thereon, the mandrel being connected to the dognut and tubing string for co-rotation therewith. The tubular body supports a multi-enveloping worm for engagement with the worm wheel when the tubular body is lowered axially onto the bottom cap. When the tubular body and worm are lifted axially from the bottom cap, the worm wheel and mandrel are exposed for repair or replacement without need to pull the production string from the wellbore. The tubular housing can further house a flow tee and opposing blowout preventer ports and rams therein, forming an integrated wellhead assembly.

15 Claims, 10 Drawing Sheets

(51) Int. Cl.
  *E21B 33/06*    (2006.01)
  *E21B 33/03*    (2006.01)
  *E21B 34/02*    (2006.01)

(52) U.S. Cl.
  CPC .............. *F16H 1/16* (2013.01); *E21B 33/061* (2013.01); *E21B 34/02* (2013.01)

(56) References Cited

U.S. PATENT DOCUMENTS

| | | | |
|---|---|---|---|
| 5,875,841 A * | 3/1999 | Wright | E21B 33/062 |
| | | | 137/614.19 |
| 5,964,286 A * | 10/1999 | Cuppen | E21B 33/0415 |
| | | | 166/75.14 |
| 6,543,533 B2 | 4/2003 | Meek et al. | |
| 6,834,717 B2 | 12/2004 | Bland | |
| 8,544,535 B2 | 10/2013 | Cote et al. | |
| 8,794,306 B2 | 8/2014 | Cote et al. | |
| 9,869,150 B2 | 1/2018 | Cote et al. | |
| 2011/0247799 A1* | 10/2011 | June | E21B 23/00 |
| | | | 166/212 |
| 2012/0085552 A1* | 4/2012 | Travis | E21B 33/0415 |
| | | | 166/382 |
| 2016/0138576 A1* | 5/2016 | Rappenecker | F04B 9/045 |
| | | | 417/437 |

* cited by examiner

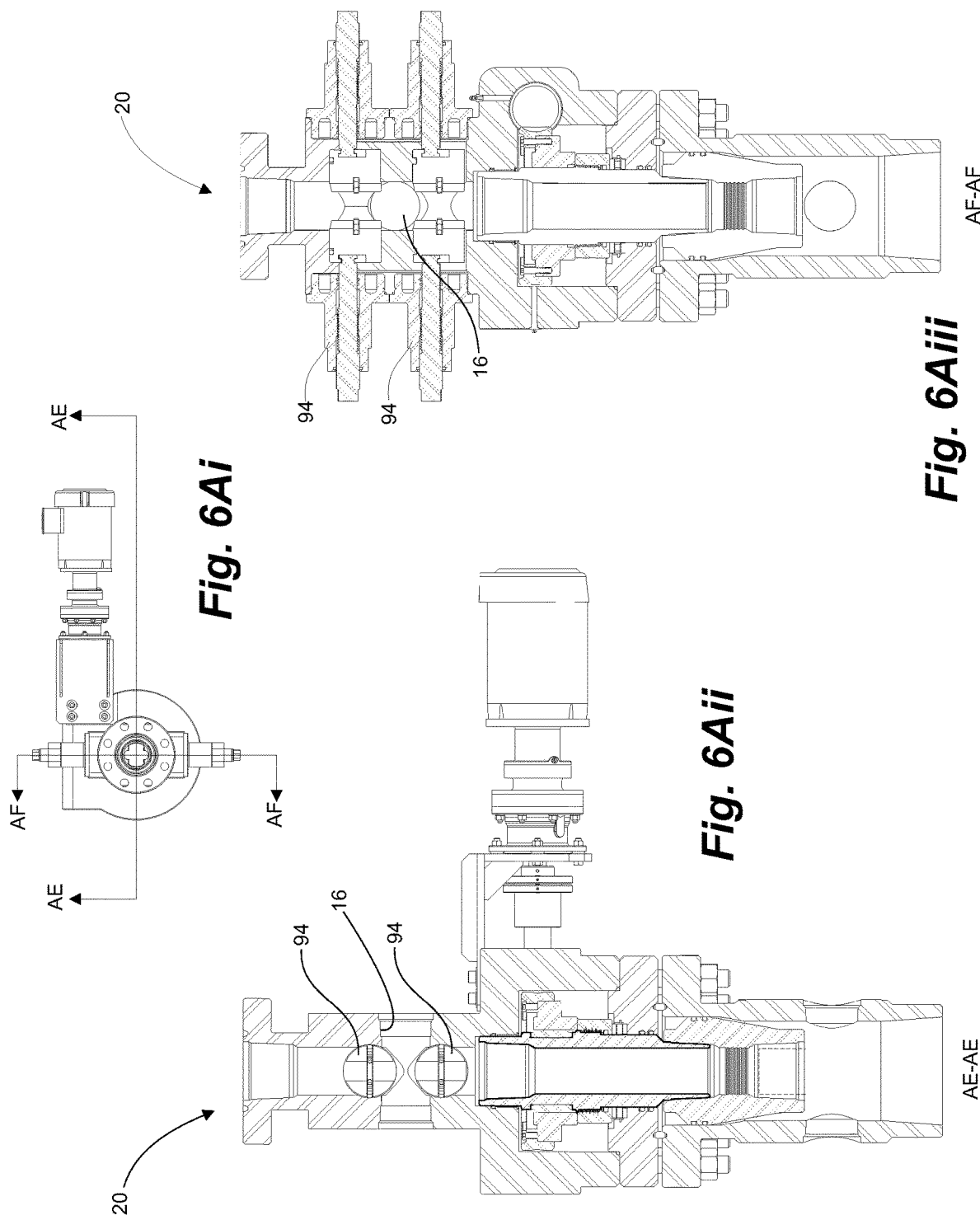

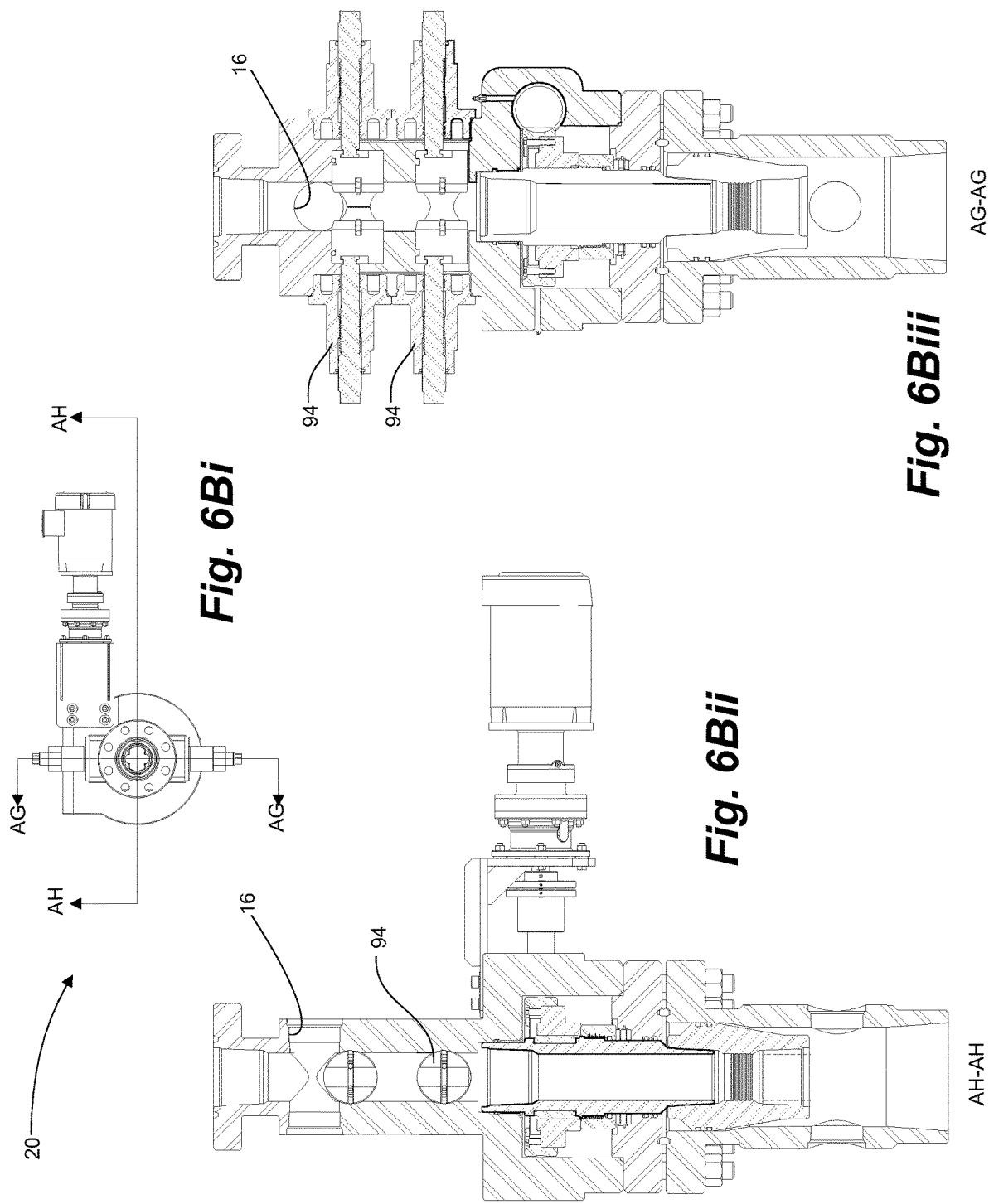

Fig. 6Cii
Fig. 6Ciii

WELLHEAD ASSEMBLY WITH INTEGRATED TUBING ROTATOR

CROSS-REFERENCE TO RELATED APPLICATIONS

This application claims the benefits under 35 U.S.C. 119(e) of U.S. Provisional Application Ser. No. 62/443,108, filed Jan. 6, 2017, which is incorporated herein by reference in its entirety.

FIELD

Embodiments taught herein relate to apparatus for rotating a tubing string in a wellbore integrated into a wellhead assembly and, more particularly, apparatus which at least provides sufficient torque to rotate the tubing string in deep and deviated wellbores.

BACKGROUND

Wellhead assemblies are utilized in the oil and gas industry to connect any number of different apparatus to a wellbore. A tubing hanger or dognut axially supports a production string inside production casing in the wellbore. A tubing rotator, operatively connected to the tubing hanger, is incorporated into the wellhead assembly to rotate the production tubing. Rotation of the tubing avoids localized wear for minimizing tubing failures arising from contact during reciprocation or rotation of a rod string therein, such as for operating an artificial lift pump in the production string.

It is known to provide integrated wellhead assemblies having upper and lower portions, either cast as a single unit, welded together or otherwise integrally coupled. The upper portion generally incorporates blow-out preventers for sealing a bore through the upper portion. The blow out preventers generally include one or more sets of rams, including but not limited to blind rams that seal against one another and rod rams that seal against an outer surface of a polished rod connected to the artificial lift pump, or both. A flow tee may be incorporated into the upper portion of the assembly to provide a secondary flow path fluidly connected to a bore of the wellhead assembly. The tubing hanger is generally supported in the lower portion of the wellhead assembly. The lower portion may further comprise ports which are in fluid communication to an annulus between production casing and production tubing, supported by the tubing hanger, in the wellbore. The tubing hanger may include sealing elements that isolate the annulus from the bore of the upper portion of the wellhead.

Conventional tubing rotators are typically separate units which are assembled between the blowout preventer (BOP) and the tubing head. Integrated tubing rotators are known however generally provide insufficient torque to rotate a tubing string in deviated wellbores or in deep wellbores, such as in wellbores greater than about 6000 ft. Tubing rotators, in general, have insufficient torque capacity for use in either deep wellbores, whether straight or deviated, such as directional and slant wells, or in deviated wellbores in general. Additionally, the gearing of tubing rotators is typically a complicated arrangement of a series of worm gears and a planetary gear box, which provides a number of different locations for potential leakage.

Repair of conventional tubing rotators typically requires pulling the tubing to surface and clamping the tubing thereat to allow the tubing rotator to be removed for repair or replacement. This is generally a time consuming and costly procedure which requires additional equipment, such as a service or drilling rig.

Conventional tubing rotators may comprise a load shoulder on a mandrel, which is operatively connected to the tubing string, for supporting the load thereof when the mandrel is set down on axial roller bearings for rotation of the mandrel and the tubing string, with or without a dognut. In U.S. Pat. No. 5,964,286 to Cuppen, the load shoulder is connected at a top of the mandrel or is integral with the mandrel extending through the bore of a rotator body. The mandrel is connected directly to the tubing string or is connected to a dognut which is connected to the tubing string. Where the load shoulder is integral with the mandrel, the rotator body cannot be lifted off the mandrel however, in embodiments where the load shoulder is not integral, split rings engage grooves in the mandrel with the load shoulder to hang the tubing string with the dognut unseated. The addition of the split rings allows the mandrel to lift the dognut and thereafter to be seated onto the rotator. In another embodiment taught by Cuppen, the load shoulder is a split ring engaged between a shoulder on the mandrel and the top of a ring gear.

There is interest in wellhead assemblies that incorporate sealing systems, such as blowout preventers, and tubing rotators capable of providing sufficient torque to rotate tubing in deep wellbores, in deviated wellbores and in deep and deviated wellbores. There is interest in low profile tubing rotators that fit within conventional wellhead footprints or flange diameters. In particular there is interest in flexible systems that can be incorporated with a variety of different tubing heads and which have a more simplified and robust design. Further still, there is interest in tubing rotators that can be repaired without having to pull the production string from the wellbore.

SUMMARY

Embodiments of a wellhead assembly taught herein utilize a tubular body having a removable bottom cap to house a tubing rotator comprising a multi-enveloping worm gear assembly to provide sufficient torque to rotate tubing strings in deep and/or deviated wellbores. The bottom cap is supported on a wellhead flange for connection thereto and the tubular body supported thereon has a chamber sized to accommodate a multi-enveloping worm wheel of the multi-enveloping gear assembly. The multi-enveloping worm wheel is rotatably supported on the bottom cap.

In embodiments taught herein, a multi-enveloping worm is supported in the tubular body permitting axial lifting and lowering of the multi-enveloping worm with the tubular body to disengage and engage the multi-enveloping worm with the multi-enveloping worm wheel supported by the bottom cap.

Further, as the tubular body is removable from the bottom cap, which continues to support the mandrel operatively connected to the tubing string supported in the wellbore, the tubular body and multi-enveloping worm can be axially lifted to expose the remaining components of at least the tubing rotator without using a rig and without lifting the tubing string from the wellbore.

In embodiments, the same tubular body can also accommodate a flow tee and opposing blowout preventer ports having rams therein for forming an integrated wellhead assembly. A height of the integrated assembly is generally lower than combinations of conventional tubing rotators, flow tees and blowout preventer assemblies.

In one broad aspect, a wellhead assembly comprises a tubular body having a chamber formed therein. A bottom cap is adapted for connection to a tubing head and supported thereon, the tubing head rotatably supporting a tubing string depending therefrom, the tubular body being removably secured to the bottom cap. A tubing rotator is located in the chamber comprising a mandrel extending axially through the chamber and through the bottom cap for connection to the tubing string therebelow, the mandrel being sealed from the chamber; and a multi-enveloping worm gear assembly having a multi-enveloping worm wheel driveably connected to the mandrel, both of which are rotatably supported in the bottom cap; and a multi-enveloping worm for driving connection to the multi-enveloping worm wheel, the multi-enveloping worm being supported in the tubular body and axially moveable therewith to disengage and engage with the multi-enveloping worm wheel when axially lifted from or lowered onto the bottom cap.

In another broad aspect, a method for rigless servicing of at least a tubing rotator in a wellhead assembly, the tubing rotator operatively connected to a tubing string, supported in a wellbore from a wellhead, for rotation thereof, comprises disconnecting a tubular body from a bottom cap secured to the tubing head. The tubular body supporting a multi-enveloping worm of the tubing rotator therein is axially lifted from the bottom cap, the worm disengaging from a multi-enveloping worm wheel rotatably supported by a mandrel extending through the bottom cap, for exposing at least the multi-enveloping worm wheel of the tubing rotator, the bottom cap and mandrel, operatively connected to the tubing string, continuing to support the tubing string therefrom. The at least the worm, the wheel and/or the mandrel, is serviced or replaced, wherein the tubing string remains in the wellbore.

In yet another broad aspect, a method for set-up and installation of a wellhead assembly on a tubing head for supporting the wellhead assembly thereon, the tubing head supporting a dognut therein for connection to a tubing string suspended therefrom in a wellbore, comprises connecting the dognut to the tubing string and to a lower end of a mandrel extending through a bottom cap. The tubing string and dognut are lowered into the tubing head, the bottom cap landing on the tubing head. The bottom cap is secured to the tubing head. A load shoulder is threaded onto the mandrel of the tubing rotator, axial roller thrust bearings being positioned between the load shoulder and the bottom cap for rotatably supporting the mandrel thereon. An adapter ring is connected to the mandrel, the adapter ring being supported above and on the load shoulder. A multi-enveloping worm wheel of a multi-enveloping worm gear is positioned about the mandrel for co-rotation therewith, the multi-enveloping worm wheel being supported on the adapter ring. The dognut is set into a seat in the tubing head. The dognut is then lifted above the seat to permit co-rotation of the dognut and the tubing string connected in the tubing head with the mandrel; and thereafter the load shoulder is rotated about the mandrel for moving the mandrel within a limited axial space for fixing the dognut above the seat and supporting the load shoulder on the axial roller thrust bearings. A multi-enveloping worm is supported in a tubular body. The tubular body and multi-enveloping worm is lowered axially onto the bottom cap, over the mandrel and the multi-enveloping worm wheel, the multi-enveloping worm drivingly engaging the multi-enveloping worm wheel and the tubular body is secured to the bottom cap.

In yet another broad aspect, a wellhead assembly comprises a tubular body having a chamber formed therein. A bottom cap is adapted for connection to a tubing head and supported thereon, the tubing head rotatably supporting a tubing string depending therefrom, the tubular body being removably secured to the bottom cap. A tubing rotator is located in the chamber comprising a mandrel extending axially through the chamber and through the bottom cap for connection to the tubing string therebelow, the mandrel being sealed from the chamber. A load shoulder is threaded onto the mandrel of the tubing rotator, axial roller thrust bearings being positioned between the load shoulder and the bottom cap for rotatably supporting the mandrel thereon, wherein the load shoulder is axially moveable along the mandrel for adjusting an axial position of the mandrel in the wellhead assembly.

Regardless the type of apparatus used to rotate a mandrel in a tubing rotator, embodiments of a wellhead assembly having the adjustable load shoulder permit axial movement of the mandrel so as to lift the dognut off a seat in a variety of different sizes and designs of tubing heads for co-rotation with the mandrel. The load of the tubing string is transferred to the load shoulder through the threaded connection between the mandrel and the load shoulder. The load shoulder engages the axial roller thrust bearings therebelow, for supporting axial loading of the mandrel.

BRIEF DESCRIPTION OF THE DRAWINGS

FIGS. 6Ai to 6Ciii illustrate embodiments of a wellhead assembly having rod rams positioned above, below or on either side of the flow tee, more particularly, FIG. 6Ai is a plan view of an embodiment having two sets of rams, one above and one below the flow tee;

FIG. 6Aii is a cross-sectional view according to FIG. 6Ai along section line AE;

FIG. 6Aiii is a cross-sectional view according to FIG. 6Ai along section line AF;

FIG. 6Bi is a plan view of an embodiment having two sets of rams, both below the flow tee;

FIG. 6Bii is a cross-sectional view according to FIG. 6Bi along section line AH;

FIG. 6Biii is a cross-sectional view according to FIG. 6Bi along section line AG;

FIG. 6Cii is a cross-sectional view according to FIG. 6Ci along section line AH; and FIG. 6Ciii is a cross-sectional view according to FIG. 6Ci along section line AG.

DETAILED DESCRIPTION

Multi-enveloping worm gear assemblies, comprising multi-enveloping worm wheels and worms are known, however to date such assemblies have not been widely incorporated into tubing rotators, as to do so would add to the height of a standard wellhead assembly. Conventional flanges and bolt patterns limit the size therebetween in which the multi-enveloping gear assemblies could be installed and thus, to utilize such high-torque gear assemblies the height of the tubing rotator would need to be increased, which is not desirable. Further, a shape of a multi-enveloping worm, which is generally throated or hour-glass shaped, makes insertion into direct engagement with the worm wheel in a standard wellhead assembly, where space is limited, difficult.

Use of a multi-enveloping worm gear assembly in embodiments taught herein, creates two or more lines of contact on each gear tooth for increasing the amount of available torque for rotation of heavy, long runs of production tubing in deep wells, generally greater than about 6000 feet, and for production tubing which is run into deviated wellbores, such as directional or slant wellbores, which may also be deep wells. Use of the multi-enveloping worm gear assembly typically creates from two to six lines of contact on each gear tooth.

Embodiments of a wellhead assembly taught herein utilize a tubular body having a removable lower or bottom flange or cap for housing at least a tubing rotator. The tubing rotator comprises the multi-enveloping worm gear assembly which is capable of providing sufficient torque capacity for use rotating tubing strings in either deep wellbores, whether straight or deviated such as directional and slant wells, or in deviated wellbores for drivingly engaging a multi-enveloping worm wheel which is operatively connected to rotate the tubing string, suspended in a tubing head, such as by a dognut.

Further still, in embodiments taught herein, use of the separate, removable bottom cap permits the tubular body mounted thereon to be capable of housing, not only the tubing rotator, but also other wellhead components, such as a flow tee and opposing blowout preventer ports and rams therein forming an integrated wellhead assembly. The removable bottom cap also further increases the flexibility of the system as the bottom cap can be customized to accommodate different size flanges and bolt patterns, according to embodiments taught herein.

Embodiments taught herein further comprise an axially moveable load shoulder which provides the ability to selectively adjust the location of the load shoulder, connected to a mandrel, for limited axial movement of the mandrel within tubular body to unseat the dognut from an interior bore of the tubing string suspended therefrom permitting use of embodiments of the wellhead assembly taught herein on a variety of conventional tubing head designs.

Figure 1A:
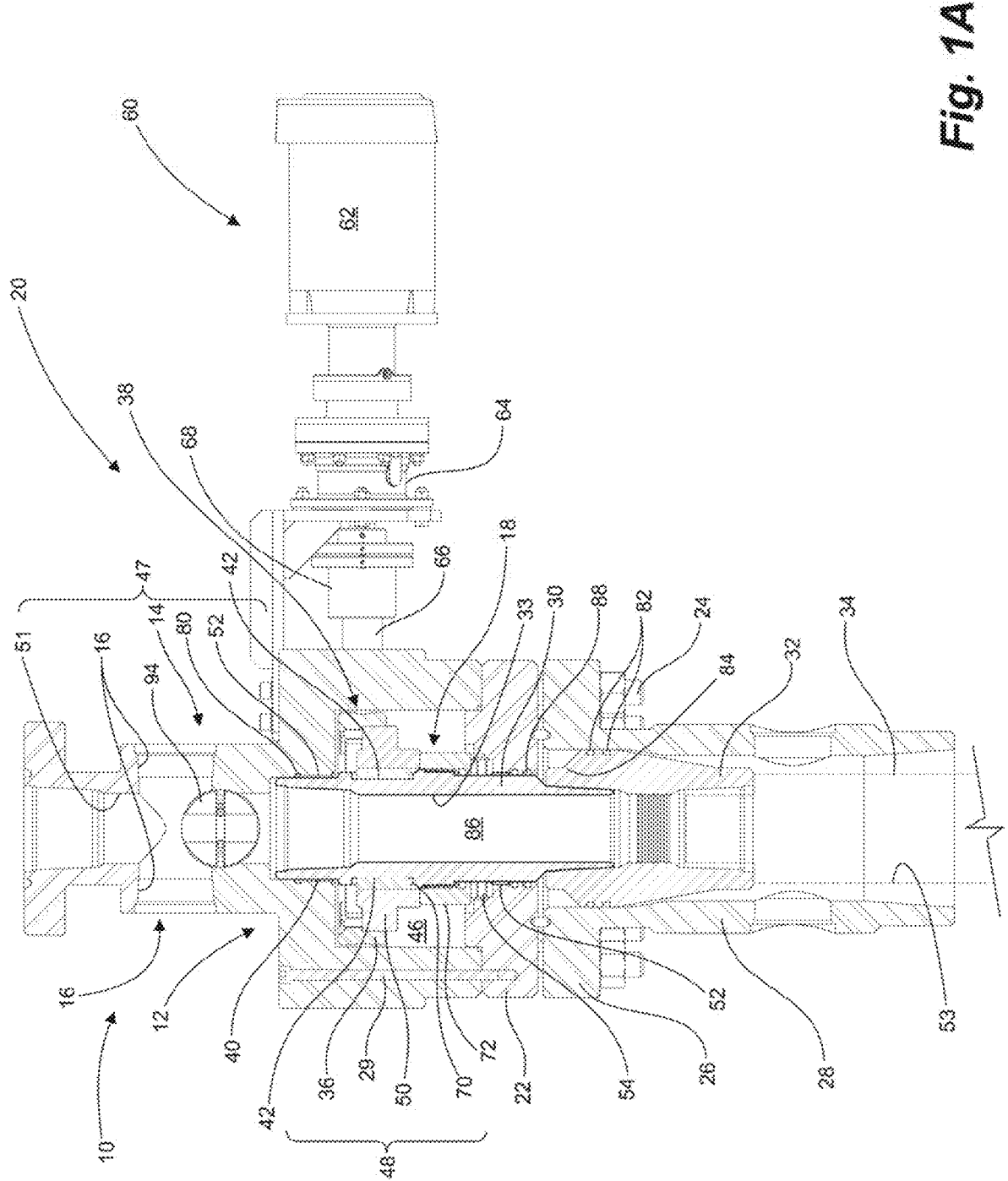
FIG. 1A is a cross-sectional view of a wellhead assembly according to an embodiment, sectioned through a flow tee, a dognut in a tubing head to which an integrated BOP/flowtee body and tubing rotator are connected, is operatively engaged to a mandrel in the tubing rotator and is shown lifted from a dognut seat in the dognut for co-rotation with the mandrel, a production tubing string connected to the mandrel for co-rotation therewith being shown in dotted lines.
Figure 1B:
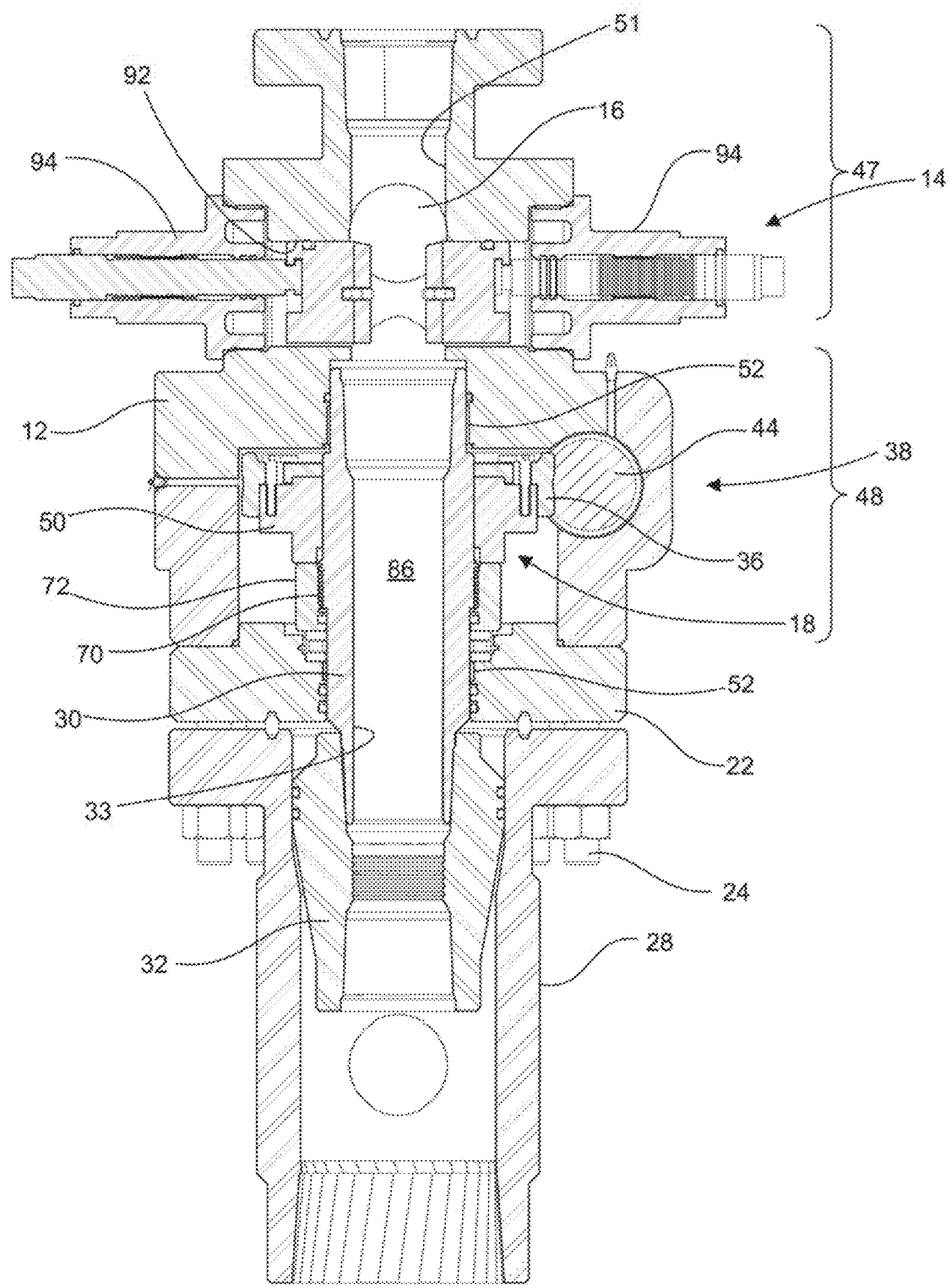
FIG. 1B is a cross-sectional view according to FIG. 1A, sectioned through the rams, a drive assembly having been removed for clarity.
Figure 1C:
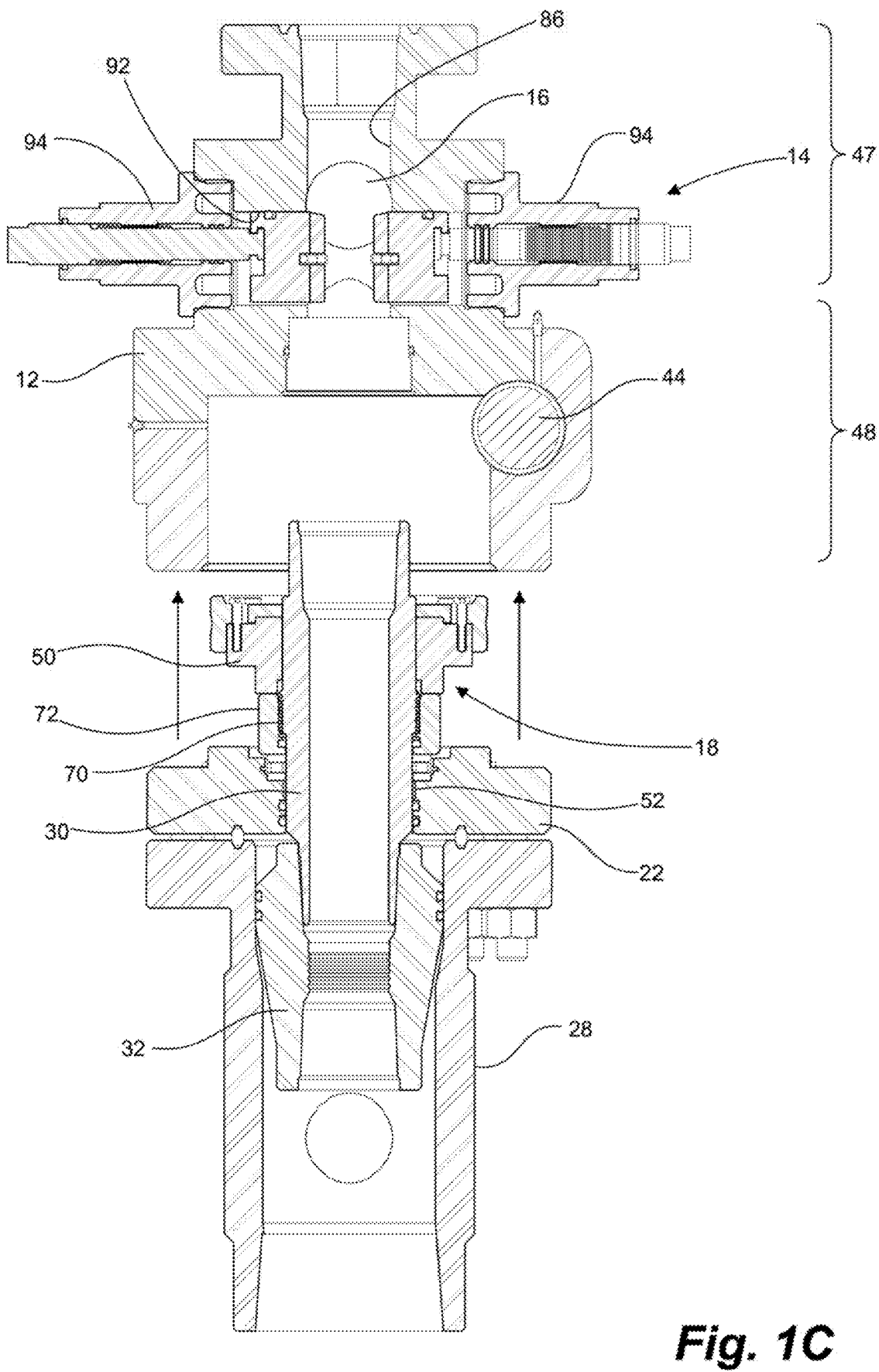
FIG. 1C is a cross-sectional view according to FIG. 1B, the tubular body which supports the multi-enveloping worm having been lifted axially from the bottom cap which supports the worm wheel.

Having reference to FIGS. 1A, 1B and 1C, in an embodiment, a wellhead assembly 10 comprises a tubular body 12 which is capable of housing a blowout preventer (BOP) 14 and a flow tee 16, such as taught in Applicant's issued U.S. Pat. No. 9,016,362 and issued Canadian patents 2,349,988 and 2,716,430, as well as the tubing rotator 18, for connection to a removable bottom flange or cap 22 to form an integrated wellhead assembly 20. The removable bottom cap 22 supports the tubular body 12, referred to herein as a BOP/flow tee body 12, of the integrated wellhead assembly 20 thereon. The removable bottom cap 22 is supported on and connected to a tubing head flange 26 on a tubing head 28, such as by a plurality of bolts or studs 24. The bottom cap 22 is removably connected to the BOP/flow tee body 12 using bolts 29.

A tubular mandrel 30 extends through the housing 12 and is rotatably supported by the bottom cap 22. A lower end 31 of the mandrel 30, which extends through the bottom cap 22, is threaded into a conventional dognut 32, which is connected to a production tubing string 34. The tubular mandrel 30 has a mandrel bore 33 formed therethrough. A worm wheel 36 of a multi-enveloping worm gear assembly 38 is operatively connected to the mandrel 30 for rotation therewith, adjacent a top 40 of the mandrel 30. In embodiments, the worm wheel 36 is operatively connected to the mandrel 30 using two or more keys 42. Opposing keys 42 act to balance the worm wheel 36 for rotation within the BOP/flow tee body 12. Further, there is sufficient axial spacing provided to further allow balancing of the worm wheel 36 and engagement with a multi-enveloping worm 44 (FIG. 1B), which is supported in the tubular body 12.

Integration of the multi-enveloping worm gear assembly 38 into Applicant's BOP/flow tee body 12 takes advantage of a relatively large chamber 46 formed within the BOP/flow tee body 12. The large chamber 46 accommodates the mandrel 30 and the robust multi-enveloping worm wheel 36, which is generally larger than conventional worm wheels used in tubing rotators to date. Teeth on the multi-enveloping worm wheel 36 and multi-enveloping worm 44 are not shown herein to simplify the drawings however, as is understood with respect to multi-enveloping worm gear assemblies 38, having more than one tooth engaged between the multi-enveloping worm wheel 36 and the multi-enveloping worm 44 increases the torque available for rotating the mandrel 30 and dognut 32 to rotate the tubing 34 attached thereto. The mandrel bore 33 is sealed from the chamber 46 as described below.

With further reference to FIGS. 1A-1C, in embodiments the BOP/flow tee body 12 comprises an upper portion 47 which accommodates the flow tee 16 and the BOP 14. The BOP/flow tee body 12 further comprises a lower portion 48 having a diameter, larger than the upper portion, forming the large chamber 46. The upper portion 47 has a bore 51 therein which is contiguous with the mandrel bore 33 and a bore 53 of the tubing string 34 for forming a contiguous fluid bore 86 therethrough.

Figure 2:
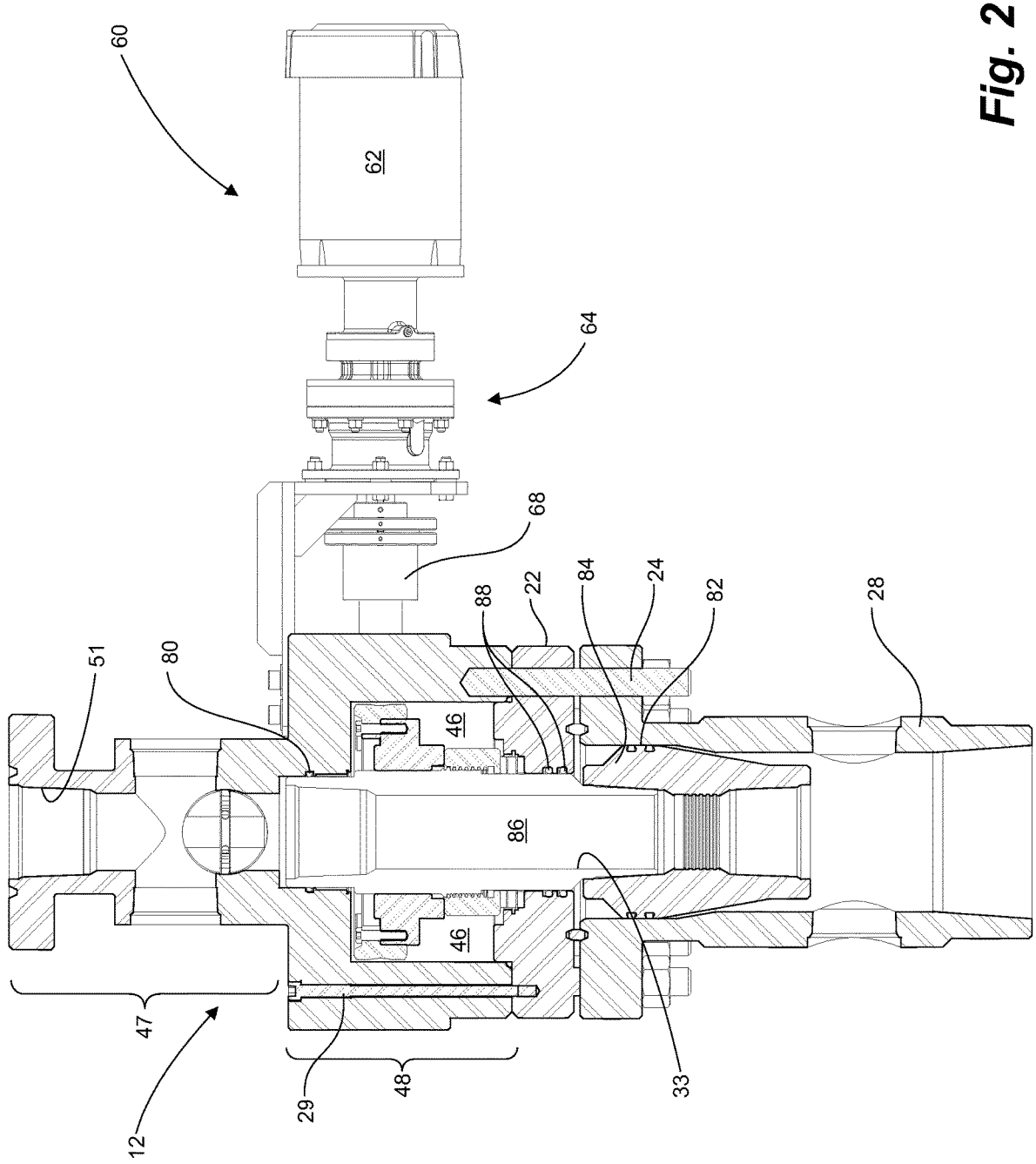
FIG. 2 is a cross-sectional view of an embodiment of a wellhead assembly according to FIG. 1A, having the bottom cap configured to accommodate a 9" tubing head.

As shown in FIG. 2, the bottom cap 22 on the integrated wellhead assembly 20, can accommodate bolts or studs 24 on a variety of tubing heads 28 using a standard bolt pattern.

The bottom cap 22 however can be exchanged for a bottom cap 22 suitable to accommodate different tubing heads 28. Further, in embodiments the bottom cap 22 can be customized to accommodate different sized tubing heads 28, such as a 9" tubing head 28 as shown and tubing heads 28 having different bolt patterns as required.

Further, the removably connected bottom cap 22 allows the BOP/flow tee body 12 to be disconnected and axially removed from the bottom cap 22 for accessing the components of the tubing rotator 18 therein for servicing and replacement, without having to pull the tubing string 34 from the wellbore, as further discussed below.

Figure 3:
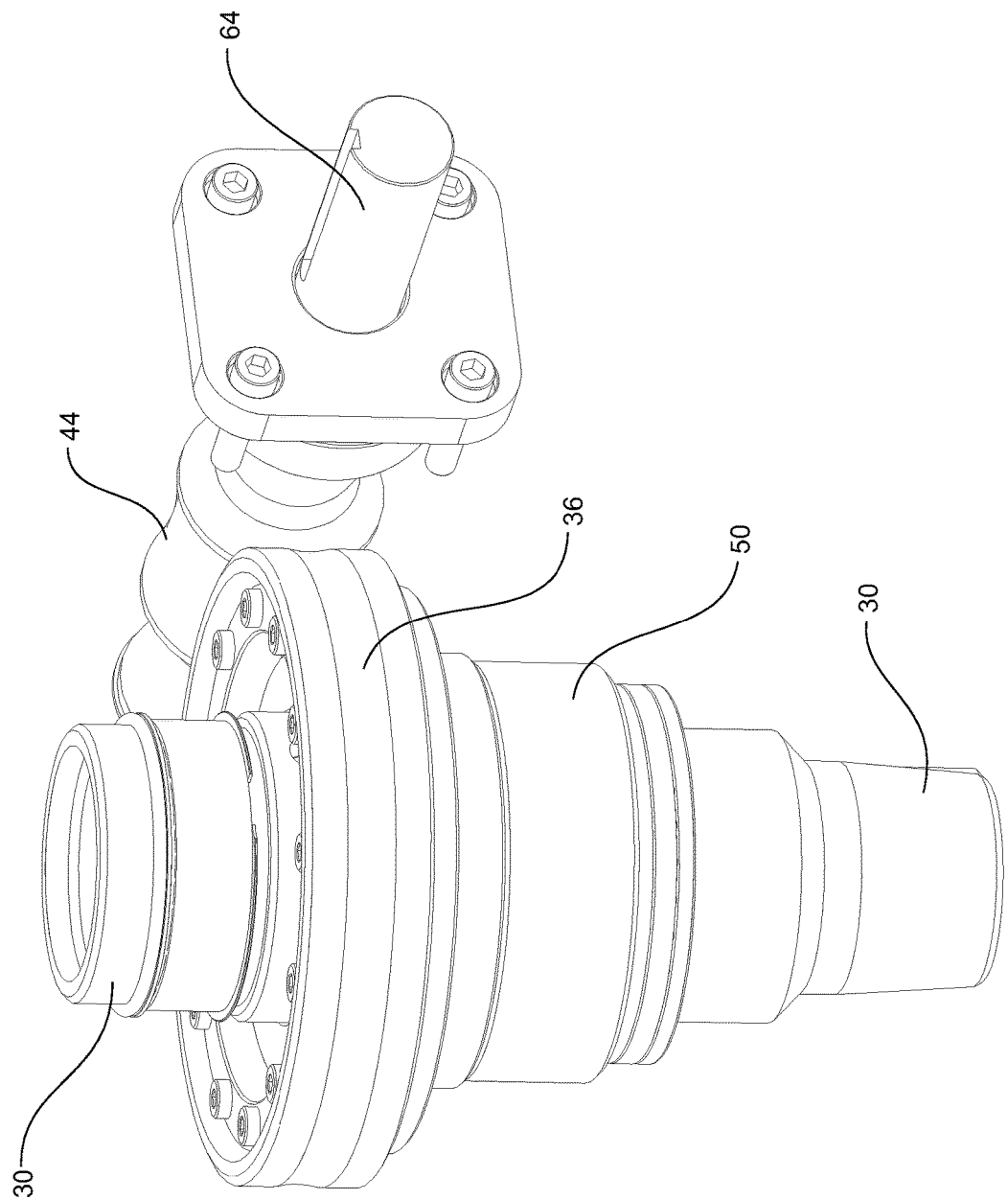
FIG. 3 is a perspective view of a multi-envelope worm gear assembly incorporated in the wellhead assembly according to FIG. 1A, comprising a worm wheel supported for co-rotation with the mandrel and an hourglass-shaped multi-enveloping worm engaged with the worm wheel and having an adapter ring positioned therebelow, a load shoulder, the BOP/flow tee body and bottom cap having been removed for clarity.

As shown in FIG. 3, in embodiments, the multi-enveloping worm 44 is a throated or hourglass-shaped worm 44. In embodiments, the BOP/flow tee body 12 supports the multi-enveloping worm 44 therein to permit the multi-enveloping worm 44 to be lifted and lowered axially with the BOP/flow tee body 12 to disengage and engage with the worm wheel 36 supported on the mandrel 30.

As seen in FIGS. 1A, 1B and 3, in embodiments the multi-enveloping worm wheel 36 is supported about the mandrel 30, for driving engagement with the multi-enveloping worm 44, by an adapter ring 50 located about the mandrel 30 below the multi-enveloping worm wheel 36. The adapter ring 50 comprises the opposing keys 42 for connection to the mandrel 30 and co-rotation therewith. In embodiments, the multi-enveloping worm wheel 36 and adapter ring 50 are clearance fit to the mandrel 30. Thrust bushings 52 adjacent a top 40 and a bottom 49 of the mandrel 30 support radial loading of the mandrel 30 preventing the multi-enveloping worm 44 from disengaging from the multi-enveloping worm wheel 36.

An adjustable load shoulder ring 70 is threadably engaged to the mandrel 30 below the adapter ring 50 for limited axial movement of the mandrel 30 relative to the load shoulder 70. Threads 72 for connecting between the load shoulder 70 and the mandrel 30 are generally large square threads, such as locking ACME threads. The load of the tubing string 34, hanging from the dognut 32 and mandrel 30, is transferred through the threads 72 to the load shoulder 70. The load shoulder 70 engages axial roller thrust bearings 54 therebelow, supported between the bottom cap 22 and the load shoulder 70, for supporting axial loading of the mandrel 30 and rotation of the mandrel 30 relative to the BOP/flow tee body 12 and the bottom cap 22.

Limited axial spacing is provided in the tubular body 12 to allow the mandrel 30 to move axially relative to the load shoulder 70. When the mandrel 30, connected to the dognut 32 and tubing string 34, is initially lifted within the limited axial spacing to unseat the dognut 32 to permit rotation, the load shoulder 70 is rotated about the mandrel threads 72 to move axially therealong the mandrel 30, to fix the position of the dognut 32 in the tubing head 28 to accommodate different sizes and styles of tubing heads 28, the load shoulder 70 being supported on the axial roller thrust bearings 54 therebelow. Axial movement of the mandrel 30 is further limited by a location of a first, upper primary seal 80, adjacent the top 40 of the mandrel 30, for sealing between the mandrel 30 and the BOP/flowtee body 12 for preventing fluids in the contiguous axial bore 86 from leaking therebetween. The axial movement is also further limited by a second set primary seals 82 located adjacent a top 84 of the dognut 32 for sealing between the dognut 32 and the tubing head 28 for preventing fluids from the axial bore 86 to leak thereby and reach the axial roller thrust bearings 54. A secondary, backup seal arrangement 88 is provided between the bottom cap 22 and the mandrel 30 to act as a backup to the primary seals 82 in the dognut 32.

Regardless the apparatus operatively connected to the mandrel 30 for rotation of the mandrel 30 and the tubing string 34 connected thereto, the novel adjustable load shoulder 70 taught herein can be incorporated onto the mandrel of a tubing rotator to increase the flexibility of the tubing rotator to be used with a variety of different sizes and designs of well head 28.

In embodiments taught herein, sufficient power is provided to drive the multi-enveloping worm 44 and to overcome any increases in friction resulting from use of the multi-envelope worm gear assembly 38. A drive system 60, drivingly connected to the multi-enveloping worm 44 to rotate the worm wheel 36, mandrel 30, dognut 32 and tubing string 34 connected thereto, can be any suitable manual, mechanical, hydraulic, pneumatic or electric drive system, as is known in the art.

By way of example and without intent to limit embodiments disclosed herein thereto, embodiments using an electric drive 60 are described herein and are shown in FIGS. 1A-6C. In embodiments, the electric drive system 60 is used to rotate the production tubing 34 in the range from about 1 to about 6 rotations per day. The electric drive system 60 comprises an explosion proof electric motor 62, generally of a universal voltage and frequency.

As is understood, gearing between the motor 62 and the multi-enveloping worm 44, to provide the required torque to rotate the tubing string 34 at the designed number of rotations is selected according to the output of the motor 62. In the embodiment shown by way of example, the motor 62 is coupled to a single enclosed gear box 64 for increasing torque and reducing speed from the motor 62 for transmission to the production tubing 34 through the mandrel 30 and the dognut 32.

In conventional tubing rotators, use of a plurality of gears and a planetary gearbox results in a plurality of locations at which leaks may occur. In contrast, in embodiments taught herein, the use of a single reduction gear motor 62 with a high ratio minimizes the number of locations where leakage may occur. By way of example, a suitable ratio to rotate the tubing string 1 revolution per day would be about 28,000:1 and to rotate the tubing string 6 revolutions per day would be about 4800:1.

A further reduction in speed is achieved by coupling a shaft from a gearbox 64 to a pinion shaft 66 connected to the multi-enveloping worm 44, using a shear collar-type torque limiter 68, as described in greater detail below.

Figure 4A:
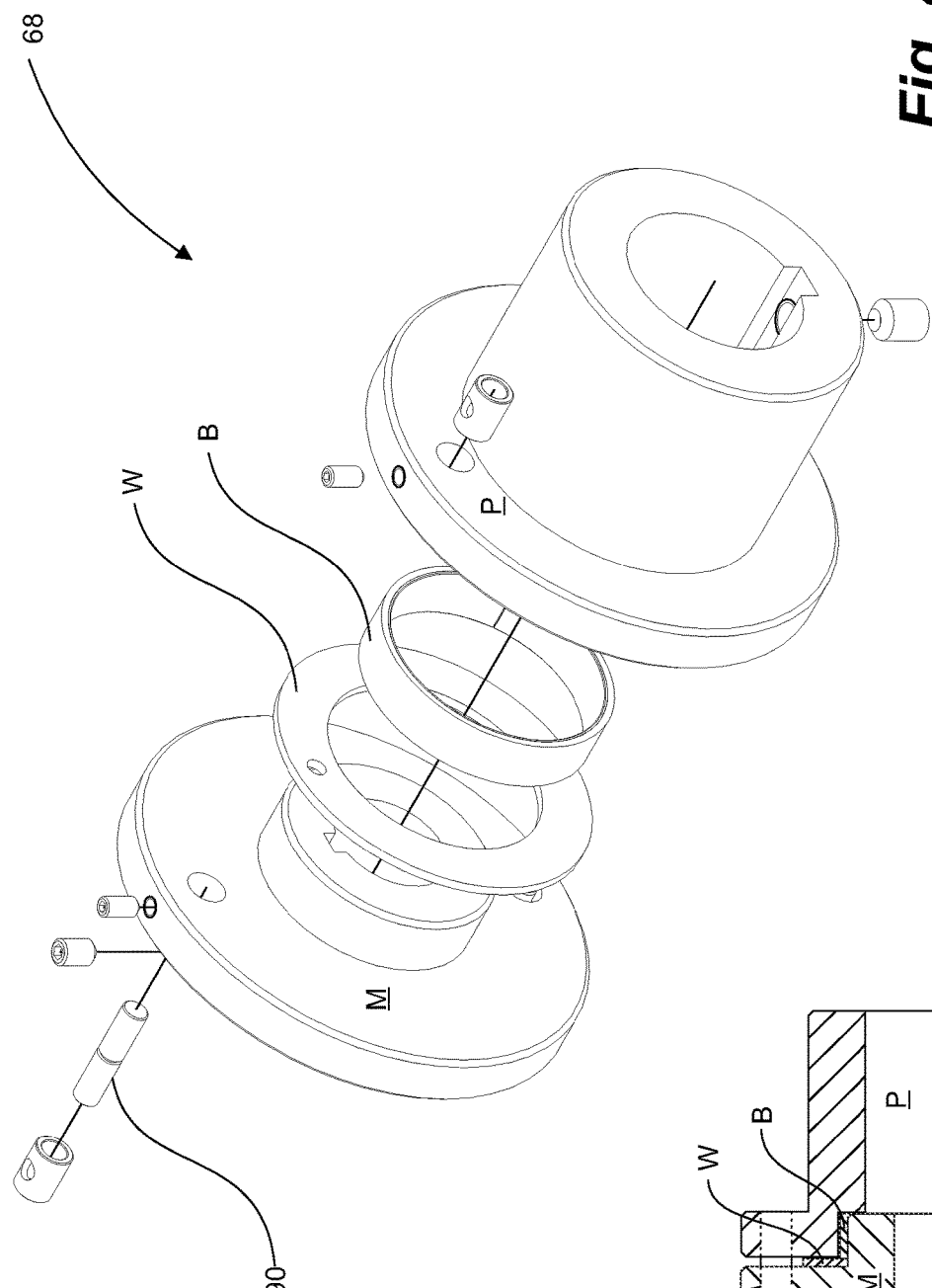
FIG. 4A is an exploded perspective view of a shear collar-type torque limiter incorporated in the wellhead assembly according to FIG. 1A for connecting between a pinion shaft connected to the worm and a drive shaft of a drive motor.
Figure 4B:
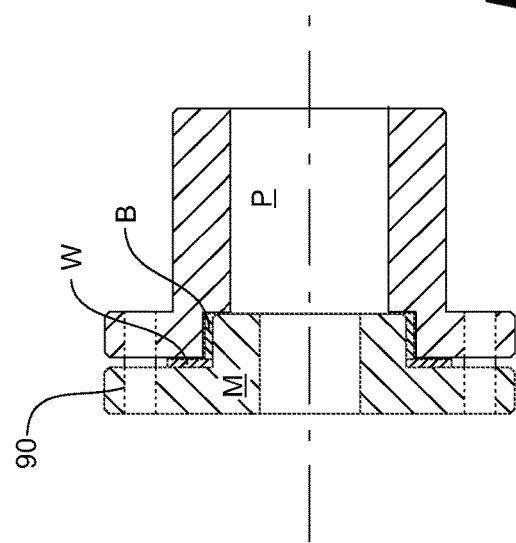
FIG. 4B is an assembled cross-sectional view of the shear collar-type torque limiter of FIG. 4A.

As shown in FIGS. 4A and 4B, the shear collar-type torque limiter 68 comprises a plurality of replaceable shear pins 90 which are selected to shear at a predetermined threshold suitable for the size of the production string and the type of wellbore into which the tubing string 34 is deployed. Thus, overloading or over-torquing the drive apparatus 60 and the production tubing string 34 operatively connected thereto, is minimized or prevented. The number of shear pins 90 required to prevent over-torquing can be changed in the field to accommodate a particular wellbore and production string, adding flexibility to the overall system.

In embodiments, the shear pins 90 are on a motor side M of the shear collar-type torque limiter 68 and connect between a motor-side connector M for connection to the driven shaft 67 and a pinion side connector P for connection to the pinion shaft 66. If the torque limiter 68 is subjected to over-torque compared to the predetermined threshold, the shear pins 90 shear, disconnecting the motor side connector M from the pinion side connector P and the worm 44 attached thereto. The motor 62 continues to rotate the driven shaft 67 and the motor side connector M, however the pinion-side connector P and the pinion shaft 66 and the worm 44 connected thereto and supported on a bushing B, cannot rotate. Thus, damage to the tubing string 34 as a result of over-torque is prevented.

As shown in FIGS. 1A and 1B, in embodiments the torque limiter 68 is sandwiched between a first gear reduction, which is the multi-enveloping worm gear 38, and a second gear reduction which is the gear box 64, to increase the amount of torque and to permit the shear pins 90 to be a practical size.

Having reference again to FIGS. 1A, 1B and 5, the rod BOP/flow tee body 12 comprises opposing ports 92 for receiving a pair of rams 94. In embodiments, the pair of rams 94 are rod lock rams designed to seal about a polished rod (not shown) in the axial bore 86 when actuated, such as taught in Applicant's issued Canadian patent 2,349,988. The polished rod is connected to a rod string depending therefrom for reciprocating or rotating in the production tubing 34 for driving a pump connected to the distal end thereof.

Figure 5:
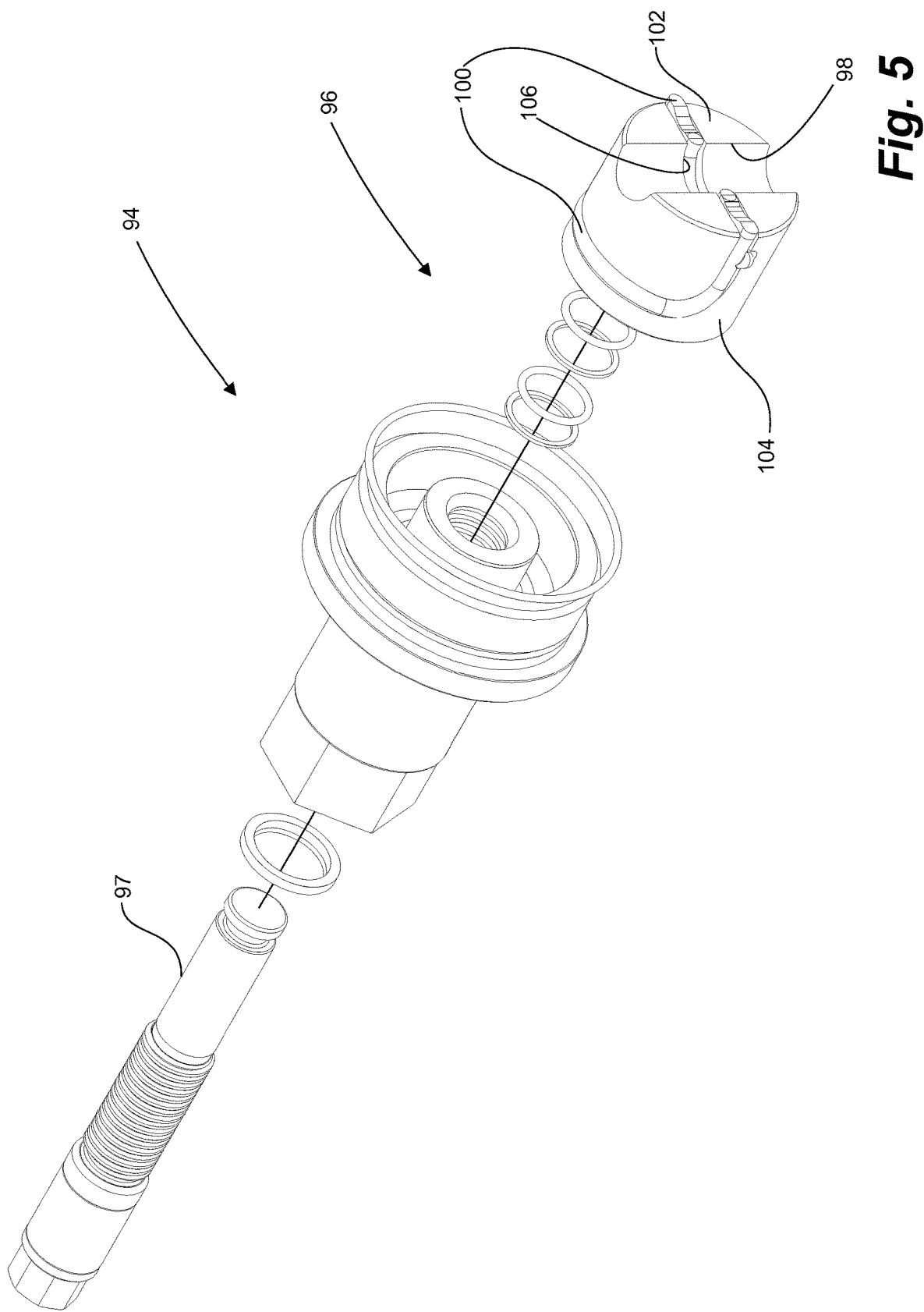
FIG. 5 is an exploded perspective view of an embodiment of a rod ram suitable for use in the BOP/flow tee body shown in FIG. 1A.

With particular reference to FIG. 5 and as taught in CA 2,349,988, in embodiments the rod lock rams 94 perform the operation of both a blowout preventer seal, and a clamp to secure the polished rod and rod string during servicing of the surface equipment. Opposing, metal, radial pistons 96, forced to engage the polish rod by bolts 97, are formed having an arcuate recess 98 therein with a curvature corresponding to the polished rod. A narrow elastomeric seal 100 runs across a vertical flat face 102 of the piston 96, along the arcuate recess 98, along a mid height of the piston 104 and circumferentially thereabout. The seal 100 is compressed within grooves 106 which permit the arcuate recess 98 to engage the polish rod with metal-to-metal contact. When actuated radially inwardly using the bolts 97, the piston 96 clamps the polished rod against axial and rotational movement while the seal 100 acts to prevent well fluid from coming up from the wellbore and escaping during servicing.

Figure 6C:
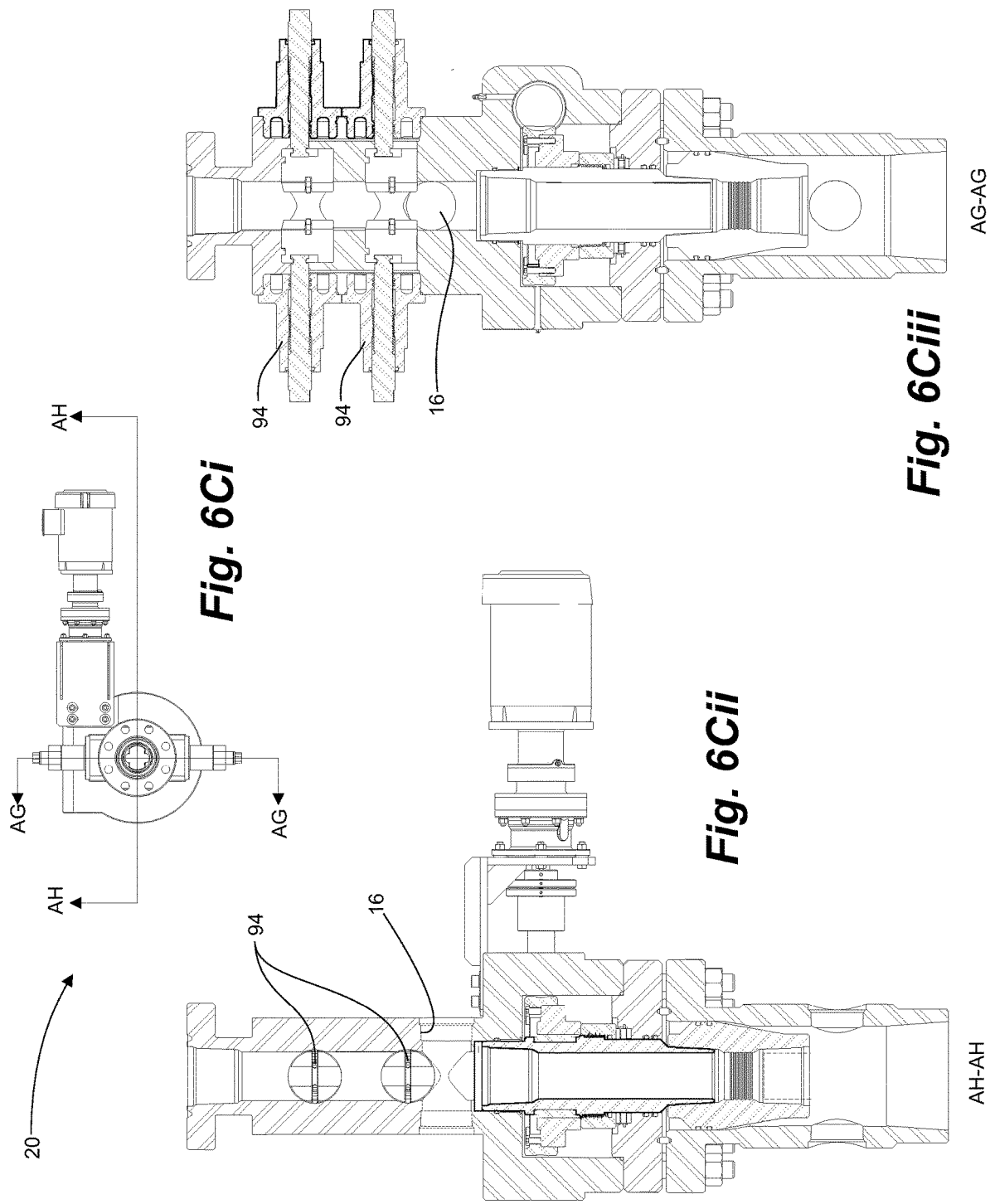
FIG. 6Ci is a plan view of an embodiment having two sets of rams, both above the flow tee.

Having reference to FIGS. 6A to 6C, the sets of rams 94 can be incorporated into the system in the BOP/flow tee body 12 above, below and on either side of the flow tee 16. Rams 94 can be rod rams to seal around the polished rod, or can include blind rams, for sealing the axial bore 86, when the rod string is removed therefrom.

Having reference again to FIGS. 1A, 1B and 2, during set-up and installation, the dognut 32 is threaded to a tubing string and to a lower end 31 of the mandrel 30 extending through the bottom cap 22. The load shoulder 70, adapter ring 50 and worm wheel 36 are operatively connected to the mandrel 30, keys 42 on the adapter ring engaging keyways on the mandrel 30. The partially assembled integrated wellhead assembly 20, dognut 32 and tubing string 34 is lowered axially, such as using a rig, into the tubing head 28 in the wellbore. The bottom cap 22 is landed on the tubing head flange 26 for connection to the tubing head 28. The dognut 32 is first set down into a seat in the tubing head 28 and is thereafter lifted by the rig to properly locate the components within the tubing head 28 to permit rotation of the dognut 32 in the tubing head 28 and to maintain the primary and secondary sealing arrangements 82,88 as described above. The load shoulder 70 is rotated about the mandrel threads 72 to fix the position of the mandrel 30 and components thereon with the load shoulder 70 engaging the axial roller thrust bearings 54 and the dognut 32 lifted above the seat. The adapter ring 50 is supported on the load shoulder 70. Markings may be provided, such as on the mandrel 30, to assist the operator in limiting the axial movement of the mandrel 30 to ensure the sealing arrangements 82,88 are maintained. The BOP/flow tee body 12 supporting the multi-enveloping worm 44 is lowered axially over the tubing rotator 18. The worm 44 moves into engagement with the multi-enveloping worm wheel 36 supported on the mandrel 30. The BOP/flow tee body 12 is secured to the bottom cap 22. The pinion shaft 66, connected to the multi-enveloping worm 44, is engaged with the drive system 60 using the shear collar-type torque limiter 68, which is connected through the gearbox 64 to the motor 62.

For rigless servicing, the BOP/flow tee body 12, supporting the multi-enveloping worm 44 therein, is disconnected from the bottom cap 22 and axially lifted from the bottom cap 22 to expose the remaining components of the tubing rotator 18, such as the multi-enveloping worm wheel 36, mandrel 30, bearings and bushings, seals and the like. The remaining components can be removed for repair or replacement or to rework other components of the integrated wellhead assembly 20, without removing the tubing string 34, hung from the dognut 32 therebelow, from the wellbore. Hence a rig is not required to service embodiments taught herein. Wellbore control is typically maintained by threading a conventional back pressure valve into internal threads in the dognut 32 prior to removal of the BOP/flow tee body 12 from the bottom cap 22.

What is claimed is:
1. A wellhead assembly comprising:
a tubular body having a chamber formed therein;
a bottom cap, adapted for connection to a tubing head and supported thereon, the tubing head rotatably supporting a tubing string depending therefrom, the tubular body being removably secured to the bottom cap independently of the connection of the bottom cap to the tubing head; and
a tubing rotator located in the chamber comprising:
a mandrel extending axially through the chamber and through the bottom cap for connection to the tubing string therebelow, the mandrel being sealed from the chamber; and
a multi-enveloping worm gear assembly having
a multi-enveloping worm wheel driveably connected to the mandrel, both of which are rotatably supported on the bottom cap; and
a multi-enveloping worm for driving connection to the multi-enveloping worm wheel, the multi-enveloping worm being supported in the tubular body and axially moveable therewith to disengage and engage with the multi-enveloping worm wheel when axially lifted from or lowered onto the bottom cap;
wherein the tubular body is configured to be capable of being removed from the bottom cap while the bottom cap is connected to the tubing head.

2. The wellhead assembly of claim 1 further comprising axial roller thrust bearings acting between the mandrel, extending therethrough, and the bottom cap for rotatably supporting axial loads thereon during rotation of the mandrel and the multi-enveloping worm wheel thereon.

3. The wellhead assembly of claim 1 further comprising an adapter ring located about the mandrel and connected thereto for supporting the worm wheel thereon.

4. The wellhead assembly of claim 3 wherein the adapter ring is connected to the mandrel by opposing keys.

5. The wellhead assembly of claim 2, wherein the tubing string is supported by a dognut in the tubing head and the mandrel is connected at a lower end to the dognut for co-rotation of the dognut and tubing string therewith, further comprising:

an adjustable load shoulder ring, threadably engaged about the mandrel, the load ring shoulder ring being axially moveable along the mandrel for lifting the dognut connected thereto from a seat in the tubing head to permit rotation of the dognut and the tubing string, the load shoulder ring engaging the axial roller thrust bearings therebelow for accepting loading from the tubing string.

6. The wellhead assembly of claim 5 wherein the tubular body comprises:

an upper body portion having an upper bore therein; and a lower body portion defining the chamber therein, the chamber having a diameter greater than the upper bore for housing the worm wheel therein, and wherein the mandrel extends from the upper bore to the dognut, the mandrel having a bore therethrough contiguous with the upper bore and a bore of the tubing string therebelow.

7. The wellhead assembly of claim 6 further comprising one or more upper primary seals adjacent a top of the mandrel, sealing between the mandrel and the body; and one or more lower primary seals in the dognut for sealing between the dognut and the tubing head.

8. The wellhead assembly of claim 7 wherein the axial movement of the mandrel and the load ring shoulder ring is limited for maintaining the sealing of the one or more upper and lower primary seals.

9. The wellhead assembly of claim 8 further comprising one or more secondary backup seals in the bottom cap for sealing between the mandrel and the bottom cap.

10. The wellhead assembly of claim 1 wherein the mandrel further comprises thrust bushings adjacent a top and a bottom of the mandrel for supporting radial loading thereon.

11. The wellhead assembly of claim 6 wherein the wellhead assembly is an integrated wellhead assembly, the upper body further comprising:

a flow tee fluidly connected to the upper bore; and one or more opposing blowout preventer ports fluidly connected to the upper bore for housing opposing rams therein.

12. The integrated wellhead assembly of claim 1 further comprising a drive located outside the bore and drivingly connected to the multi-enveloping worm for driving the multi-enveloping worm wheel for co-rotation of the mandrel and the tubing string driveably connected thereto.

13. The integrated wellhead assembly of claim 12, wherein the drive is connected to the multi-enveloping worm using a shear collar-type torque limiter comprising one or more replaceable shear pins for shearing at a predetermined threshold.

14. The integrated wellhead assembly of claim 13 wherein the predetermined threshold is determined by a size of the tubing string, a depth of the wellbore, a deviation of the wellbore and combinations thereof.

15. The integrated wellhead assembly of claim 12 wherein the drive comprises a single reduction gear motor having a gear ratio to rotate the tubing string from 1 to 6 revolutions per day.

* * * * *